Patented Feb. 9, 1954

2,668,857

UNITED STATES PATENT OFFICE 2,668,857

PROCESS FOR THE PREPARATION OF β - DIMETHYL - AMINOETHYL - BENZ-HYDRYL ETHER

Haaye Veldstra and Antony Marie Akkerman, Amsterdam, Netherlands, assignors to N. V. Amsterdamsche Chininefabriek, Amsterdam, Netherlands, a company of the Netherlands No Drawing. Application November 13, 1951, Serial No. 256,146

9 Claims. (Cl. 260—570)

This invention relates to processes for the preparation of β-dimethyl-aminoethyl-benzhydryl ether.

Various methods for the preparation of dialkylaminoethyl ethers of benzhydrol and of analogous compounds are known, amongst which the following may be mentioned.

Firstly a benzhydryl halide was treated with sodium dialkylamino ethylate or with a dialkylaminoethanol in the presence of an acid-binding agent; as an acid-binding agent may also serve the amino alcohol in excess.

Secondly a halide of benzhydrol was treated with β-chloro-ethanol, and the reaction product was subsequently coupled with a dialkylamine.

Thirdly sodium benzhydrol was reacted with a β-dialkylaminoethyl halide or with 1.2-dichloroethane, the series of reactions being completed in the latter case in a second stage by reaction with a dialkyl amine.

Finally another possibility that has been suggested consisted in reacting benzhydroles which are substituted in the para position with dimethylamino ethanol in the presence of water-binding substances, for example concentrated sulphuric acid, with or without the addition of catalytically acting metal salts.

Surprisingly it has now been found that the β-dimethylaminoethyl-benzhydryl ether can be obtained by a new, simpler and cheaper method which was not known either for the preparation of analogous compounds or for etherification in general. According to the present invention a process for the preparation of β-dimethylaminoethyl-benzhydryl ether is characterized in that benzhydrol is reacted with a melt of a hydrohalide of β-dimethylaminoethanol, said melt being maintained at a temperature of 180° C. to 185° C. It is a characteristic feature of this new method that no use is made therein of any agents serving to bind water or acid.

Particularly suitable substances for use in the improved process according to the present invention are the hydrochloride and the hydrobromide of β-dimethylaminoethanol.

According to the invention consequently a process for the preparation of β-dimethylaminoethyl-benzhydryl ether may be carried out in such a way that benzhydrol is reacted with a melt of the hydrochloride of β-dimethylaminoethanol, said melt being maintained at a temperature of 180° C. to 185° C.

Another process according to the invention for the preparation of β-dimethylaminoethyl-benzhydryl ether consequently may be carried out in such a way that benzhydrol is reacted with a melt of the hydrobromide of β-dimethylaminoethanol, said melt being maintained at a temperature of 180° C. to 185° C.

The water formed in the reaction escapes, and the desired ether can be obtained from the reaction mixture in a simple manner, for example by extraction.

The new method according to the invention is specific for the hydrohalides of β-dimethylaminoethanol, since the use, for example, of the sulphuric acid salt produces practically no yield of the desired ether.

The reaction is preferably carried out by adding the benzhydrol in portions to the melt of the hydrohalide maintained at 180° C. to 185° C.

The following example illustrates one method of carrying the present invention into effect:

In a reaction vessel provided with a thermometer and a mechanical stirrer, 675 cubic centimetres of concentrated hydrochloric acid (specific gravity 1.19) were fed, in the course of twenty minutes, through a funnel having its opening below the surface of the liquid, into 725 grams of β-dimethylaminoethanol, while stirring and cooling with water. In the course of about 30 minutes the temperature was subsequently raised to 180° C. to 185° C., during which treatment all the water escaped.

In the course of 60 to 75 minutes, 1500 grams of benzhydrol were added in portions to the melt maintained at a temperature of 180° C. to 185° C., while vigorously stirring; during this treatment, water vapour escaped. After termination of the addition the reaction mixture was kept at about 180° C. for another 45 minutes. Thereupon the mixture was allowed to cool, and the reaction mixture was mixed with water and benzene before crystallization set in. The benzene dissolved the dibenzhydryl ether which was formed as a side-product during the reaction, while the β-dimethylaminoethyl-benzhydryl ether dissolved in the aqueous layer as the hydrochloride.

After the separated aqueous layer had been made alkaline in reaction, the ether separated as an oil, which was dissolved in benzene. The solution was dried over solid sodium hydroxide, and after removal of the benzene the ether was distilled in vacuo. The yield of the product obtained was 890 grams, having a boiling point of 128° C. at 0.18 mm. pressure.

What we claim is:

1. A method of preparing beta-dimethylaminoethyl-benzhydryl ether, comprising the steps of etherifying benzhydrol with a salt in melted form selected from the group consisting of the hydrochloride and the hydrobromide of beta-dimethylamino-ethanol, maintaining the melt at a temperature of 180° to 185° C., and then recovering the beta-dimethylamino-ethyl-benzhydryl ether therefrom.

2. A method according to claim 1; wherein said salt is the hydrochloride of beta-dimethylamino-ethanol.

3. A method according to claim 1; wherein said salt is the hydrobromide of beta-dimethylamino-ethanol.

4. A method of preparing beta-dimethylamino-ethyl-benzhydryl ether, comprising the steps of melting a salt selected from the group consisting of the hydrochloride and hydrobromide of beta-dimethylamino-ethanol, gradually adding benzhydrol to said melted salt while maintaining the salt at a temperature of 180° to 185° C., and then recovering the beta-dimethylamino-ethyl-benzhydryl ether therefrom.

5. A method according to claim 4; wherein said salt is the hydrochloride of beta-dimethylamino-ethanol.

6. A method according to claim 4; wherein said salt is the hydrobromide of beta-dimethylamino-ethanol.

7. A method of preparing beta-dimethylamino-ethyl-benzhydryl ether, comprising the steps of melting a salt selected from the group consisting of the hydrochloride and hydrobromide of beta - dimethylamino - ethanol, maintaining said salt at a temperature of 180° C. to 185° C., gradually adding benzhydrol to the melted salt until one-half to one mole of benzhydrol has been added for each mole of beta-dimethylamino-ethanol, stirring the mixture for at least twenty minutes while maintaining said temperature, and then recovering the beta-dimethylamino-ethyl-benzhydryl ether therefrom.

8. A method according to claim 7; wherein said salt is the hydrochloride of beta-dimethylamino-ethanol.

9. A method according to claim 7; wherein said salt is the hydrobromide of beta-dimethylamino-ethanol.

HAAYE VELDSTRA.
ANTONY MARIE AKKERMAN.

No references cited.